United States Patent [19]
Olcerst

[11] Patent Number: 5,742,516
[45] Date of Patent: Apr. 21, 1998

[54] INDOOR AIR QUALITY AND VENTILATION ASSESSMENT MONITORING DEVICE

[76] Inventor: Robert Olcerst, 505 Drury La., Baltimore, Md. 21229

[21] Appl. No.: 214,194

[22] Filed: Mar. 17, 1994

[51] Int. Cl.$^6$ .................... F24F 3/16; F24F 7/00
[52] U.S. Cl. ............ 364/496; 73/23.2; 73/31.01; 73/31.02; 73/863.01; 73/863.21; 436/133; 436/137; 436/138; 454/256; 250/430; 340/632
[58] Field of Search .................. 338/34; 128/630; 62/176.6; 436/151, 133, 137, 136; 98/1.5; 73/31.02, 23.2, 31.01, 863.01, 863.02, 863.2, 863.21; 364/496; 454/256; 250/430, 431, 432; 340/632, 633

[56] References Cited

U.S. PATENT DOCUMENTS

| | | | |
|---|---|---|---|
| 4,384,283 | 5/1983 | Drope et al. | 340/632 |
| 4,423,407 | 12/1983 | Zuckerman | 338/34 |
| 4,499,377 | 2/1985 | Presser | 250/343 |
| 4,670,405 | 6/1987 | Stetter et al. | 436/151 |
| 4,813,519 | 3/1989 | Matsubara et al. | 188/299 |
| 4,960,041 | 10/1990 | Kiser | 98/1.5 |
| 5,226,416 | 7/1993 | Bethune et al. | 128/630 |
| 5,255,556 | 10/1993 | Lobdell | 73/31.02 |
| 5,261,596 | 11/1993 | Tachibana et al. | 236/49.3 |
| 5,292,280 | 3/1994 | Janu et al. | 454/229 |
| 5,333,783 | 8/1994 | Catan | 236/13 |
| 5,428,964 | 7/1995 | Lobdell | 62/176.6 |
| 5,464,369 | 11/1995 | Federspiel | 454/256 |

OTHER PUBLICATIONS

A. Jung et al, "An Improved Method to Determine the Age-of-Air from Tracer-Gas Measurements", *3rd Int'l Conf.*, vol. 3, pp. 231–244 (Aalborg, DN 1992).

C. Roulet et al, "Field Comparison of Age of Air Measurement Techniques", *3rd Int'l Conf.*, vol. 3, pp. 215–229 (Aalborg, DN 1992).

B.W. Olesen et al, "Field Measurements of Air Change Effectiveness Using Tracer Gas Techniques", *13th AIVC Conference*, pp. 285–294 (1992).

C. Göthe et al, "A Simple Method of Estimating Air Recirculation in Ventilation Systems", *49 Am. Ind. Hyg. Assoc. J.*, pp. 66–69 (1988).

*Primary Examiner*—Emanuel T. Voeltz
*Assistant Examiner*—Demetra R. Smith

[57] ABSTRACT

A monitoring device system and a method for controlling ventilation in an enclosed or confined environment by regulating the effective ventilation rate, air exchange rate, mixing factors, stratification of air within the confined area, the percentage of outside air which is introduced (when possible), the percentage of recirculated air, mean air life, air half-life are described. The device may be used for controlling an HVAC system so that air quality conforms to predetermined air quality standards. The monitoring device consists of a multiport sample collection system and one or more sensors to detect determinants of air quality. The method of control uses a CPU to regulate fans, dampers, and other systems to maintain the air quality within predetermined ranges, based upon the monitoring data. A tracer gas, preferably $CO_2$, is used to determine system parameters. Measurement of additional gases and particulates and local ventilation control responsive to such toxicants is limited only by the availability of suitable detection methods.

3 Claims, 7 Drawing Sheets

INDOOR AIR QUALITY AND VENTILATION ASSESSMENT MONITORING DEVICE

BACKGROUND OF THE INVENTION

Air quality in a confined environment requires an understanding of both the sources and the sinks of the chemical contaminants that are generated and dispersed within the contained space. Air handling, such as exhaust, recycling, infiltration and exfiltration, as well as chemical treatment thereof, are the ultimate determinants of equilibrium concentrations of both contaminants and bioeffluents. The amount of outside air, the percentage of recirculated air, room air exchange rates and the "age of the air" are important parameters to be considered when characterizing air in a confined space.

The previous art addressing the assessment and measurement of conditions within a confined space was directed to determination of the amount of "outdoor air" and the psychometric relationship between the temperature of the mixed air, return air and outdoor air according to the following formula:

$$\text{Percent Outside Air} = \frac{[T_R - T_M]}{[T_R - T_0]} \times 100$$

Where $T_R$=The temperature of the return air $T_M$=The temperature of the mixed air $T_0$=The temperature of the outside air This relationship is not an useful criterion when the temperatures of the return and the mixed air are equal. Most importantly, the equation does not take into account the concept of the age of air as enunciated by Sandberg et al., *Buildings and Environment*, 18, 181 (1983), by Skaaret et al., *Environmental International*, 8, 1982 and by Sutcliffe, "A Guide to Air Change Efficiency", *Air Infiltration and Ventilation Center, Technical Note No.* 28, 1990. Methods for measuring the age of air have been described by Oelsen et al., "Field Measurements of Air Change Effectiveness Using Tracer Gas Techniques", 13th AIVC conference Nice, France, 1992, pp. 285–294, by Roulet et al., *3rd International Conference*, Aalborg, Denmark, 1992, Danyak, Lyngby, Denmark, vol. 3, pp. 215–229 (1992) and by Jung et al., *3rd International Conference*, Aalborg, Denmark 1992, vol. 3, pp. 231–243 (1992). The prior art does not disclose how to use such measurements to provide dynamic control of an enclosed environment on a real-time basis.

BRIEF SUMMARY OF THE INVENTION

This invention is directed to methods for assessing the quality of air in a confined environment and to methods for controlling or adjusting the chemical composition of ambient air in a confined environment so that the air is healthful to the occupants of that space at all times.

A confined environment includes but is not limited to submarines, mines, houses, office buildings, factories, ships, "confined spaces" as defined in 29 CFR 1.120, airplanes and a space station. For mammals to survive in any of these circumstances, it is necessary to provide an adequate supply of oxygen and it is also necessary to monitor the presence of toxic or explosive gases and to provide alarm systems or controlling devices so that an adequate supply of oxygen is present at all times and that toxic gases are removed at a rate sufficient to enable mammalian life to survive. In certain circumstances, such as mines, it is necessary to remove explosive gases because the concentration and density of these gases can result in catastrophic events.

This invention also is directed to a method for the monitoring of hazardous gases and to the control of hazardous gases through the use of a sequential monitoring system which is integrated into an air handling system which combines the functions of the fan speed-control, damper settings, mechanical and chemical filtration so as to provide a healthy environment at all times, on a real time basis.

The invention is also applicable to control of indoor air quality which does not relate to known or quantified hazardous contaminants but relates to the perceived "freshness" of the air. Secondary factors such as odor and bacterial contamination have been addressed traditionally on the basis of fixed exchange rates (c.f. ASHRAE 62–1989), not real time adjustments responsive to actual air quality under changing conditions. These secondary factors are often invoked to explain "sick building" when traditional chemical air toxics are absent or minimal.

When known toxic gases are present, they may be sampled using standard detection means. The outputs from the detections means are processed by a CPU and compared to set values. The program then controls one or more functions of an air handling unit or other control techniques.

When recognized air toxics are not a problem, but occupant loads vary during the course of a day, a non-toxic trace gas may be used as an indicator of occupancy loading and the level of exertion of the occupants. Measurement of both a toxic and a non-toxic gas is preferred for occupied locations.

DETAILED DESCRIPTION OF THE INVENTION

The invention is directed to a monitoring system which is adapted to the configuration of the confined environment which is to be monitored. The invention is also directed to sequential monitoring of different areas and to the direction of the air which is monitored to the appropriate set of centrally located detectors which have been selected to identify air contaminants which are likely to be present in those areas and which must be identified and, ultimately, controlled in particular areas. Examples, without limitation, include CO, methane, ozone, phosgene and radon. Each of these gases represents an unique and distinctive hazard which is characteristic of one or more particular locations within multiple, connected, confined environments.

To asses the capacity for a ventilation system to provide adequate ventilation in an unique chemical atmosphere, it is necessary to provide sensors which are responsive to the toxic chemicals which are indigenous to that area and it is also necessary to provide a method for measurement of a characteristic chemical which is representative of the overall air quality in the confined environment.

Carbon dioxide is a convenient marker of ambient air quality in areas such as offices and schools and restaurants, where the ventilation demand varies due to the number of people present.

Carbon dioxide is a gas which is generated by multiple sources. It is exhaled from humans and other mammals; it emanates from various heating sources; and it is emitted from motor vehicles. The carbon dioxide load in a building is a function of the number of people who are present in the building, the types of activities which are being performed and the sources of carbon dioxide in the ambient air which is introduced into the building. Heavy traffic around a building may result in the introduction of air from the outside having a high carbon dioxide concentration. At other times, the primary source of carbon dioxide may be individuals working in the building. Energy conservation requires that air be recirculated within the building to obviate the need for heating or cooling large volumes of outside air and for controlling relative humidity by adding or subtracting moisture. Recirculation is unavoidable when the space is totally enclosed, such as in a submarine and some aircraft.

Because of the numerous potential sources in a confined environment and because it is both inexpensive and comparatively non-toxic (the current ACGIH TLV for $CO_2$ is 5000), $CO_2$ is preferred to other inert gases as a non-toxic tracer. Low levels of carbon dioxide are not life threatening but provide a baseline to determine changes in ventilation conditions when measured using commercially available carbon dioxide detectors. Deviations from this continuous baseline may be used to the need to control ventilation in a confined environment.

In the first embodiment of this invention, a single sensor for carbon dioxide is used to monitor inputs from multiple locations within a confined environment or within the ventilation system supplying or withdrawing air circulated to the confined environment. A rotary valve or timed solenoid may be used to sequentially direct samples of the air to a detector. The results of the measurement are interpreted by a CPU and outputted to control systems such as dampers, fans, humidifiers, dehumidifiers, filters and traps.

In a second embodiment of the invention, the rotary valve or timed solenoid is used to direct air to multiple sensors on a timed basis and the output from the sensors, individually or multiply after processing (synthesizing), is directed to appropriate controlled devices. In a closed environment where oxygen is not immediately available from an outside source, such as a submarine or space station, an oxygen sensor may be utilized separately or in combination with a $CO_2$ detector to control bleed of LOX into the environment. In an office building or a manufacturing facility, the ratio of recirculated air and air introduced from the outside may be adjusted in response to selected control parameter(s), preferably including $CO_2$ measurement. In an environment wherein toxic chemicals are present, the exhaust rate or number of air changes per hour may be adjusted in response to the concentration of a specific toxic chemical as measured using the appropriate sensor. Trapping systems may be activated or the air flow to them redirected or enhanced.

The selection of suitable detectors is not limited. The preferred detector is a solid state detector. Gas phase spectrophotometer set to one or more dedicated wavelengths also are suitable. Where appropriate, detectors for $\alpha$, $\beta$ and $\gamma$ radiation may be employed. Wet chemical methods for detection may be used, but are not preferred due to complexity and the need for routine maintenance.

The control of particulates in a contained environment may also be monitored according to this invention. A particulate counter may constitute one of the sensors employed. Separately or concomitantly, the pressure drop across an air filter may be measured using pressure transducers, thermoanemometers or other means known to those skilled in the art. The rate of advancement of a roll filter, for example, may be controlled in response to either the particulate load as measured by the pressure drop across the filter or other means.

The CPU is programmed to control the sampling rate, the purge rate of the sampling system and to drive the selected air handling components. The data from the CPU is fit to an exponential curve which calculates the appropriate ventilation parameters for the air within the confined environment, such as the ventilation rate, the percent of outside air which is admixed or the air component which is added or trapped to meet the parameters of the theoretical curve which indicates the air quality. Also considered are the flow rate and quality of the return air, the mean age of the air, the air exchange half life and the degree of mixing characteristic of the particular confined space.

The CPU and programme employed are not particularly limiting. Commercial dataloggers such as a Metrosonic Aq-501 have been used successfully for data acquisition. The data may be downloaded using programmes such as Metrosonics MS 936 software. Any compatible mini- or microcomputer may be used to compare the acquired data with selected ranges for the component(s) and to produce output signals to appropriate devices such as dampers, fans, motors, etc.. The configuration of the system depends upon the nature of the enclosed environment, its use, and the ventilation control system selected. The software programme may be any programme written by one skilled in the art, and the programme per se is not a limitation to the invention.

Figure 1:
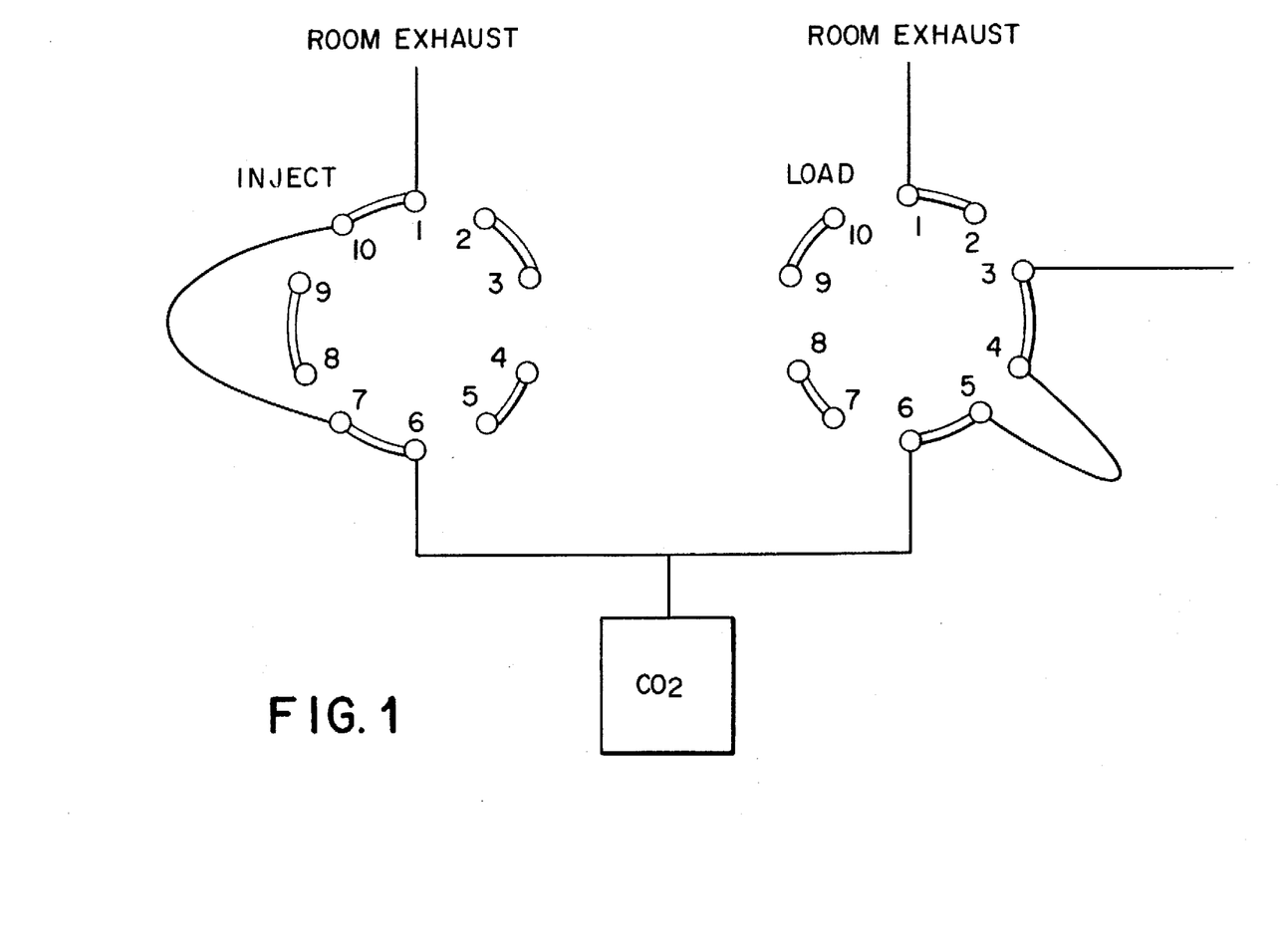
FIG. 1 is a schematic of ten port sampling valve.
Figure 2:
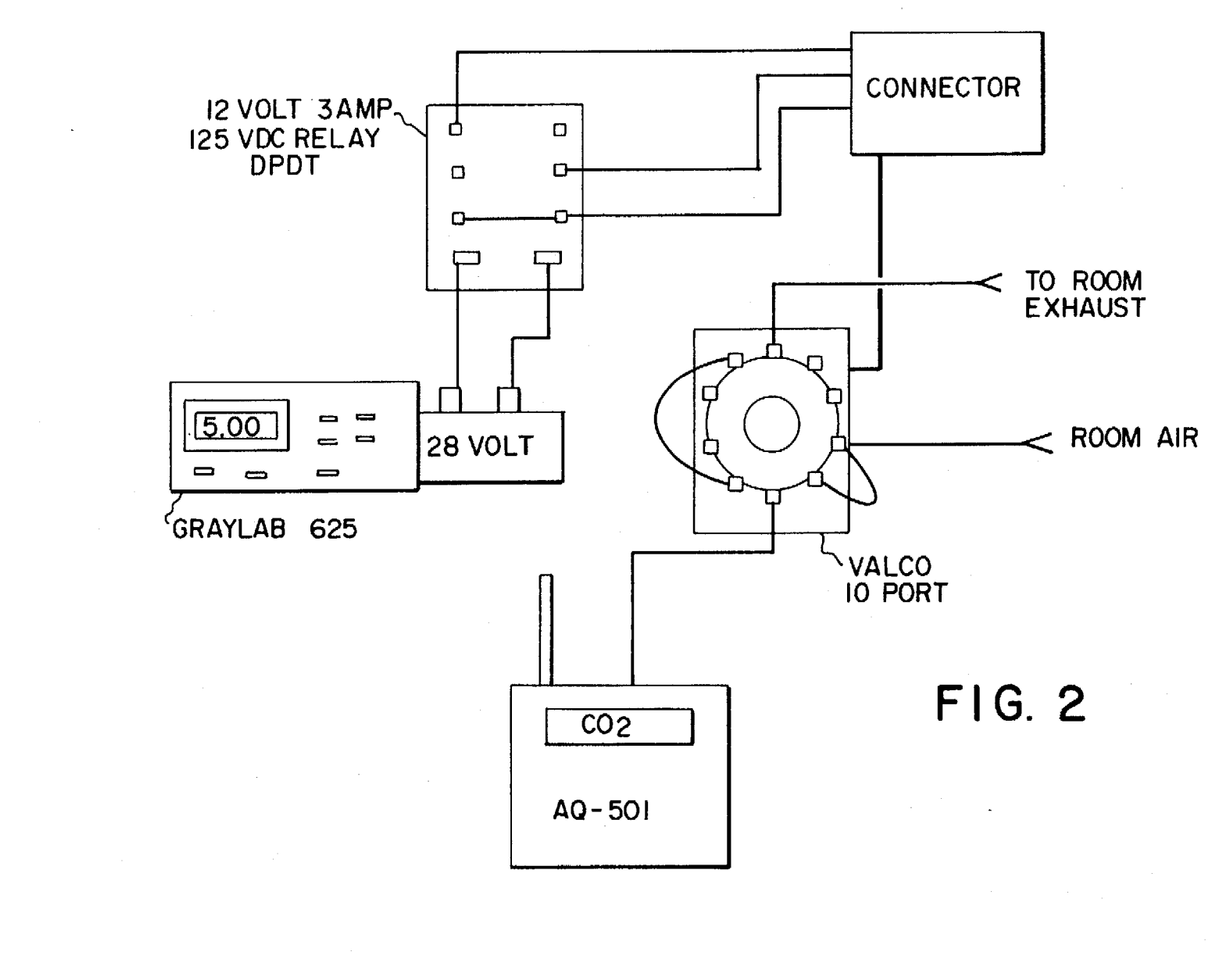
FIG. 2 is a schematic of a toxic gas monitoring configuration.

FIG. 1 is a schematic of a ten port sampling valve. The number of ports is not critical and depends upon the size and configuration of the confined space being ventilated and the number of gases which are to be measured. FIG. 2 is an illustration of a representative sampling system using readily available commercial components. The representative and illustrated device for sampling which is manufactured by VALCO® is actuated by an interval timer manufactured by GREYLAB® (Model 625 as illustrated). The relay cycling is obtained by the rotating ten port valve which switches between the load and inject configuration, as depicted in FIG. 1. Air from the confined space is introduced at port 3 and exhaust air is directed to port 1 using, for example, 1/16 inch TEFLON® Tubing. (Tubing size and selection depends upon the length of tubing required, pump capacity and reactivity of the components of air with the tubing.) A typical timing rate is 5 minutes for sampling with a 15 second switching interval.

Data analysis may be performed using any conventional CPU. In the preferred embodiment, a METROSONIC ms936 system was used and the attached figures were generated on an Hewlett Packard color jet printer. Alternative configurations and software are within the purview of this invention.

Accurate sampling requires that the system be purged between samplings. To accomplish this goal, a computer program such as GWbasic has been employed in the preferred embodiment. The program separates the logged data into two independent data sets. The first minute of a 5 minute sampling system is discarded and 4 data points are selected from the sampling time. Depending upon the configuration of the system and the software which is employed, these numbers for data points are guidelines and merely representative of the concept of the invention. The effectiveness of elimination of contaminants may be calculated according to the procedure of Oelsen and Seeler, 13th AIVC Conference, Nice, France, 1992, pp. 285–294.

The age of air in a ventilated environment may be determined by measurement of the mean residence time of a carbon dioxide trace gas. A typical method is adapted from that of Oelsen and Seeler, substituting $CO_2$ for $SF_6$. According to their method, the local age-of-air $\tau_p$ using the step-up tracer gas method is calculated as:

$$\tau_p = \int_0^\infty \left( \frac{1-C(t)}{C_\infty} \right) dt$$

and the average age-of-air is:

$$<\tau> = \frac{\int_0^\infty \left( 1 - \frac{C_{ex}(t)}{C_\infty} \right) t\, dt}{\int_0^\infty \left( 1 - \frac{C_{ex}(t)}{C_\infty} \right) dt}$$

wherein:
C(t)=concentration t, ppm;
$C_\infty$=concentration at t=∞, ppm;
$C_{ex}$=concentration in extract, ppm; and
t=time, s (h).

The air exchange half-life is determined by measuring the rate of decay of a tracer gas such as carbon dioxide as a function of time.

The degree of mixing is determined for a particular space by measuring variances in the carbon dioxide tracer gas concentration at various points in the compartment. Oelsen and Seeler prefer the term "global air change effectiveness" defined as $$\tau_N/(\tau)$$

wherein $\tau_N$ is the local age-of-air in the section return (duct).

The degree of mixing is a function of the individual space, the location of air inlet and exhaust, and the activity within the space. The degree of mixing should be determined prior to selection of the sampling location(s).

The following examples illustrate the method of practice of this invention. The use of other gases in unique environments is considered to be within the scope of this invention. The use of alternative dataloggers and detectors also is considered to be within the scope of the invention, as are all alternative procedures obvious and apparent to one skilled in the art upon perusal of this description.

EXAMPLE 1

Measurement of Carbon Dioxide

Figure 3:
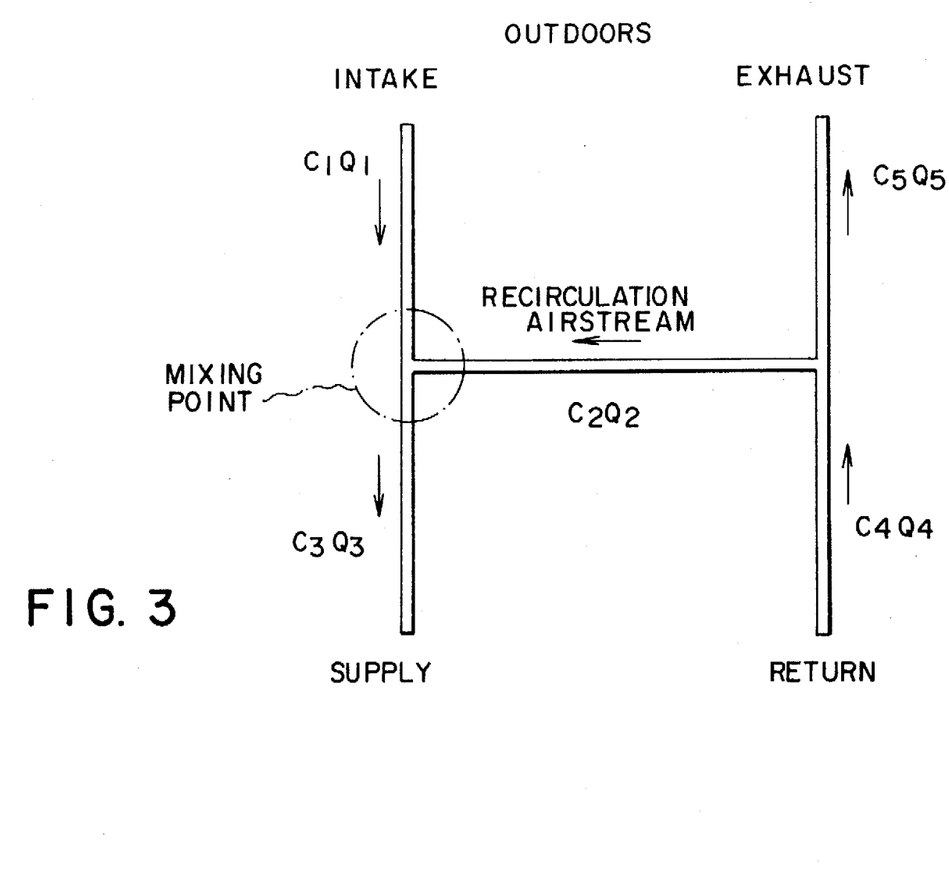
FIG. 3 is a schematic sampling configuration for the calculation of outside air and recirculating air percentages in an office building.

A METROSONIC® Aq-501 5 channel datalogger was employed. Any commercial available carbon dioxide sensor may be used, including both the electrochemical and the non-dispersive infrared types. In this example, a Teaguchi non-dispersive infrared sensor was used. The sensors sampled outside air, recirculated air, and supply air to the confined space, as shown in FIG. 2. The location of the sampling points is illustrated in FIG. 3.

Calibration of the system requires a zero gas and a standardized carbon dioxide cylinder. For purposes of this example, custom mixture 498 containing 1018±2 ppm carbon dioxide was used. That was prepared by Scott Air Products Incorporated.

A timer providing 28 volts dc to the relay was employed using a 5 minute sampling time and a 15 second switching interval.

Figure 4:
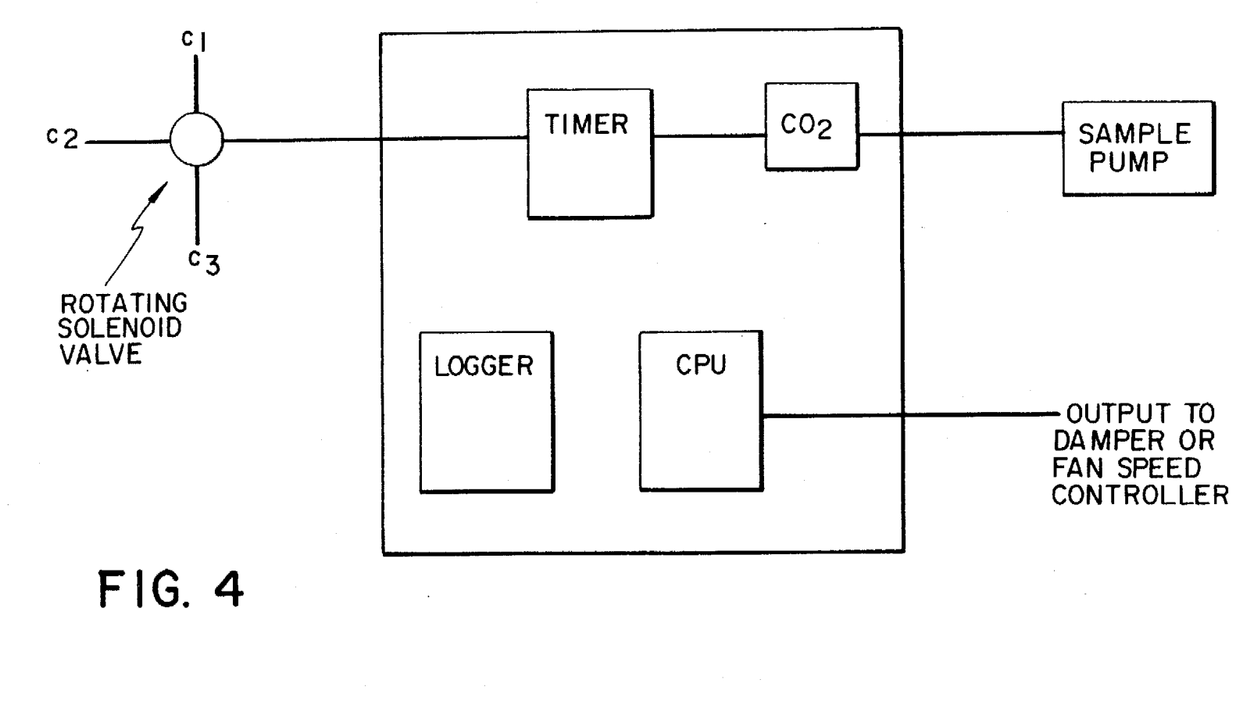
FIG. 4 is a schematic of the control configuration for a monitored HVAC system.

FIG. 4 shows the sensor configuration for the microprocessor and the carbon dioxide monitor.

Figure 6:
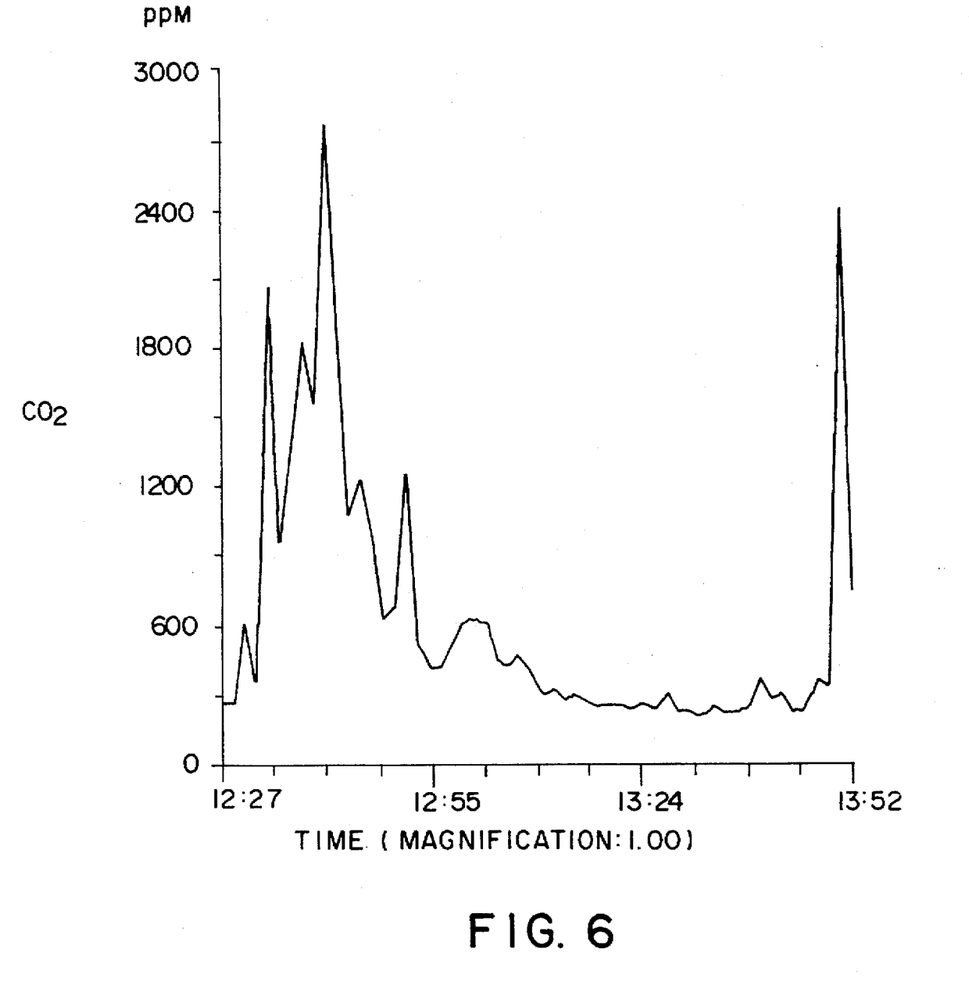
FIG. 6 illustrates a data sample using $CO_2$ as the tracer gas.
Figures 7, 8:
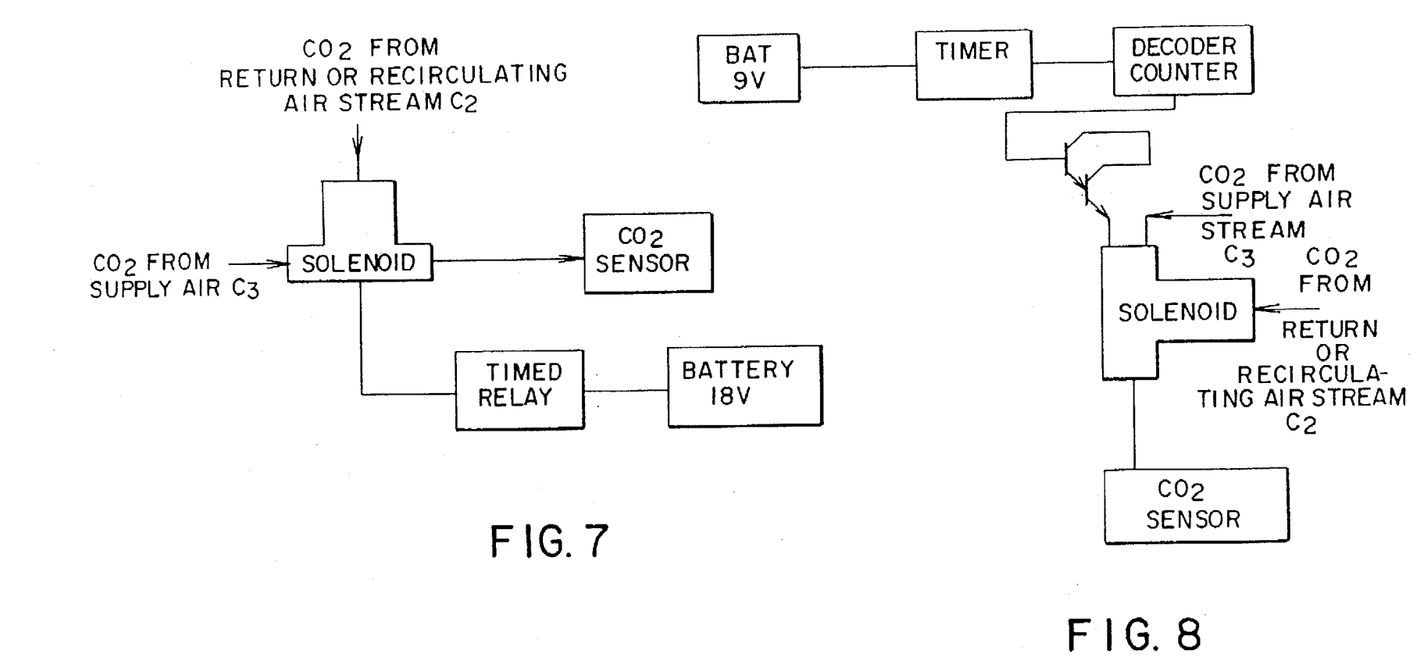
FIG. 7 is a schematic diagram of an alternative sampling train and control circuit.
FIG. 8 is a schematic of another alternative sample train control circuit.

FIG. 6 illustrates the data obtained by the method in a typical experiment.

EXAMPLE 2

Figure 5:
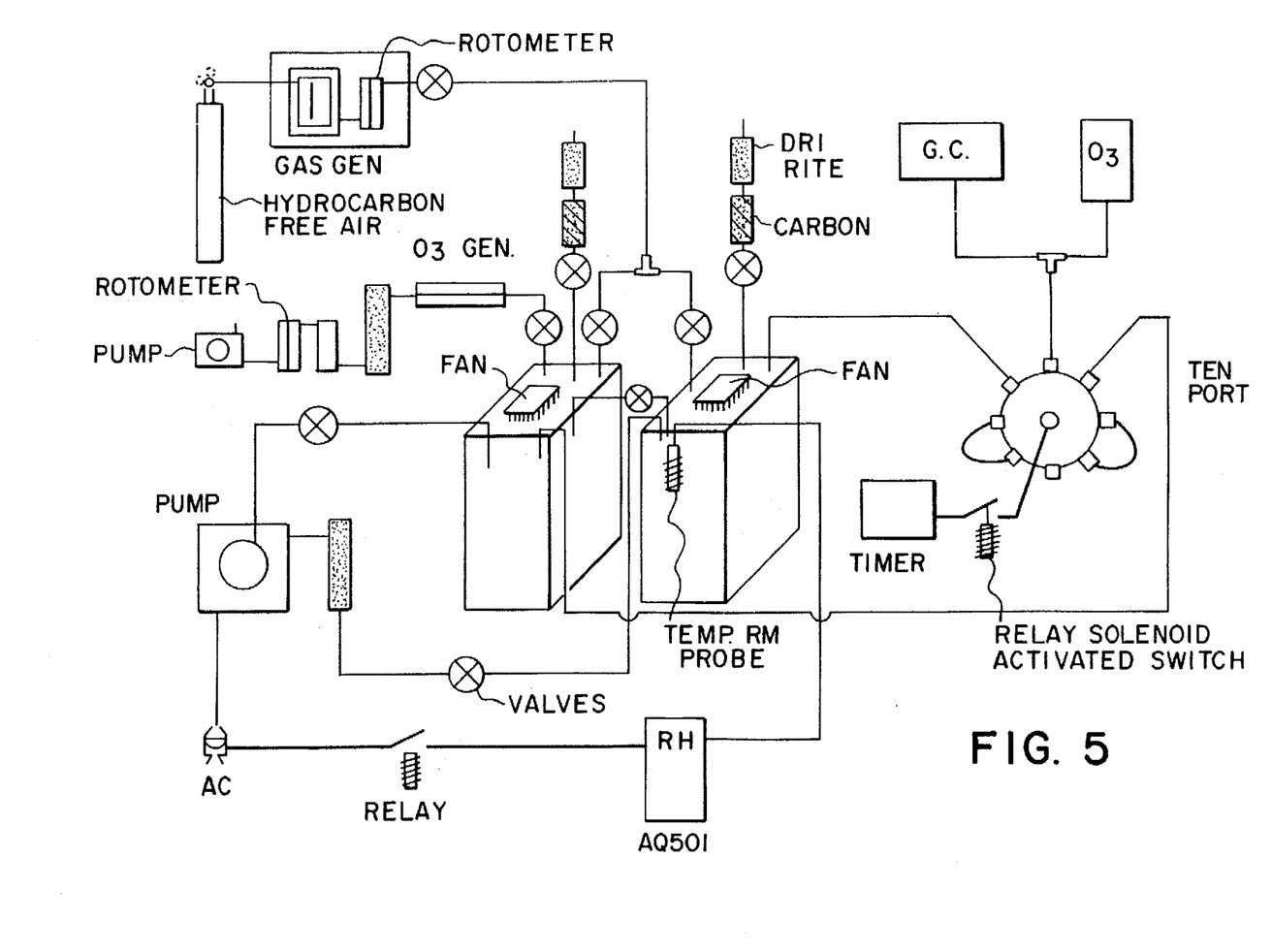
FIG. 5 is a schematic of a test system to monitor and control ozone, organic vapors and relative humidity in kinetic chambers using the basic principles of this invention.

When a specific contaminant is generated in one location, but diffusion to a second location is considered to be a concern, the air may be qualified and quantified using the actual location or by using a kinetic chamber simulator as illustrated in FIG. 5. Any suitable tracer gas is introduced into both chambers. A specific gas, such as ozone, is introduced into one chamber and a shunt between chambers is used to simulate diffusion, such as through doorways.

Formaldehyde may be measured according to this application. The ventilation rate may be controlled so that building containing urea-formaldehyde insulation is ventilated based upon any one of the ambient outside air temperature, the relative humidity, or the concentration of formaldehyde within the building. Because the breakdown of urea-formaldehyde insulation is a function of temperature and humidity, the rate of exchange of inside and outside air may be used to control formaldehyde exposures within the confined environment. This is of particular concern in what is termed as the "garment industry" because adducts of formaldehyde are frequently used to provide "permanent press" fabrics and steam pressing or ironing of these fabrics results in the emission of formaldehyde and may result in allergic symptoms among the workers. Since the steam pressing or steam ironing is a cyclic process, it is necessary adjust the rate of air exchange in response to the generation of formaldehyde by specific processes and the times when these processes are performed. Buildings insulated with formaldehyde-containing foam are ventilated similarly.

Chemical manufacturing is frequently done on a batch basis which may be repeated several times during a day and result in the emission of toxic chemicals, particularly solvents, for short periods of time. Ventilation requirements will vary depending upon the frequency of the release of these solvents into the work place. Maintaining acceptable concentrations of toxic chemicals in a working environment to maintain compliance with the Occupational Safety and Health Act requires ventilation levels which may be highly consumptive of energy. Emission of untreated air toxics from these same areas may violate the Clean Air Act. Balancing of the air introduced, the air exhausted and the treatment of exhaust air requires a monitoring and control system to which this invention is addressed.

I claim:

1. A method for controlling the quality of the air within a confined environment comprising:
   (a) introducing air into one or more sampling ports connected to one or more detectors of toxic chemicals;
   (b) introducing a known amount of a gas detectable by one or more of said detection devices into said confined environment;

(c) analyzing the output from the detectors;

(d) comparing the output from said detectors with numerical standards;

(e) controlling the functions of at least one air handling system; and (f) monitoring the function of the at least one air handling system.

2. A method for the measurement of air quality comprising:

introducing a discrete amount of carbon dioxide into a confined environment and comparing the amount of carbon dioxide which is present with the amount which should be present as a result of the intentional introduction of carbon dioxide.

3. An apparatus for the control of air quality in confined environments comprising:

(a) one or more sampling ports connected to one or more detection devices;

(b) means for introducing a known amount of a gas detectable by one or more of said detection devices;

(c) means for evaluation of the data outputted from one or more of said detection devices;

(d) means for control of an air handling system to maintain air quality in a confined environment within parameters which have been preset into the means for the evaluation of the data.

* * * * *